US00RE40141E

(19) United States
(12) Reissued Patent
Kawamura et al.

(10) Patent Number: US RE40,141 E
(45) Date of Reissued Patent: *Mar. 4, 2008

(54) RECORDING MEDIUM CARTRIDGE AND SIGNAL RECORDING APPARATUS

(75) Inventors: Ichiro Kawamura, Osaka (JP); Ryoichi Imanaka, Hirakata (JP); Yoshikazu Goto, Hirakata (JP)

(73) Assignee: Matsushita Electric Industrial Co., Ltd., Osaka (JP)

( * ) Notice: This patent is subject to a terminal disclaimer.

(21) Appl. No.: 10/014,431

(22) Filed: Dec. 14, 2001

Related U.S. Patent Documents

Reissue of:
(64) Patent No.: 5,764,622
Issued: Jun. 9, 1998
Appl. No.: 08/652,053
Filed: May 23, 1996

(30) Foreign Application Priority Data

May 23, 1995 (JP) ..... 7-123420
May 17, 1996 (JP) ..... 8-122948

(51) Int. Cl.
*G11B 23/03* (2006.01)

(52) U.S. Cl. ..... 720/733; 360/133; 720/735
(58) Field of Classification Search ..... 369/289, 369/290, 291, 292; 360/132, 133, 137; 206/308.1, 206/308.2, 308.3, 387.1, 387.11; 220/214, 220/257, 258; 720/733, 735
See application file for complete search history.

(56) References Cited

U.S. PATENT DOCUMENTS 3,990,575 A * 11/1976 Egly et al. ..... 206/387.11
4,425,999 A * 1/1984 MacDonald et al. ..... 206/308.3
4,475,222 A * 10/1984 Egendorf ..... 377/15
4,617,655 A * 10/1986 Aldenhoven ..... 369/291
4,618,061 A * 10/1986 Rubenfeld ..... 206/308.3
4,755,982 A * 7/1988 Douwes ..... 369/291
4,805,769 A * 2/1989 Soltis et al. ..... 206/308.2
5,012,380 A * 4/1991 Harissis et al. ..... 360/135
5,093,823 A * 3/1992 Ouwerkerk et al. ..... 369/291
5,150,354 A * 9/1992 Iwata et al. ..... 369/291
5,285,918 A * 2/1994 Weisburn et al. ..... 220/265
5,796,713 A * 8/1998 Tanaka ..... 369/291
5,946,290 A * 8/1999 Mizutani et al. ..... 369/291
6,125,011 A * 9/2000 Ikebe et al. ..... 360/133

FOREIGN PATENT DOCUMENTS

EP 254358 * 1/1988
EP 617425 * 9/1994
EP 768664 * 4/1997
GB 2253087 * 8/1992
JP 6-12814 * 1/1994 ..... 206/308.1

* cited by examiner

*Primary Examiner*—Angel Castro
(74) *Attorney, Agent, or Firm*—McDermott Will & Emery LLP

(57) ABSTRACT

A cartridge for housing a recording medium therein. The cartridge includes a cartridge body configured such that a signal recording apparatus can record a signal onto the recording medium when the cartridge is loaded in the signal recording apparatus. The cartridge also includes an opening in the cartridge body for removing the recording medium from the cartridge body, and a cover covering the opening. An indicator on the cartridge body indicates whether the cover has ever been opened or removed from the cartridge body.

9 Claims, 12 Drawing Sheets

RECORDING MEDIUM CARTRIDGE AND SIGNAL RECORDING APPARATUS

Matter enclosed in heavy brackets [ ] appears in the original patent but forms no part of this reissue specification; matter printed in italics indicates the additions made by reissue.

*RELATED REISSUE APPLICATIONS*

*This application is a continuation of Reissue application Ser. No. 09/558,462, which is now U.S. Pat. No. RE37,659, which is a reissue of U.S. Pat. No. 5,764,622.*

DESCRIPTION OF THE PRIOR ART

The present invention relates to a disk-shaped, recording medium housed in a cartridge, and a signal recording apparatus using such a cartridge.

Today's computers and other information equipment commonly use optical disks to meet their large memory capacity requirements. A conventional optical disk cartridge is explained below with reference to the drawings.

FIG. 12 depicts a cartridge 31 housing a recording medium 32, and having an opening window 33 through which a signal can be recorded onto the medium 32 when the cartridge 31 is mounted on a signal recording apparatus. The shutter 34 closes the opening window 33. Mounting the cartridge 31 to the signal recording apparatus automatically moves the shutter 34 and exposes the opening window 33.

Since the conventional cartridge 31, housing the disk 32, must record a desired signal accurately, the disk 32 must be protected from contaminants, such as dust or fingerprints, and from other defects, such as scratches. Such a fixed-disk structure, therefore, cannot allow a user to remove the disk 32 from its cartridge and mount it to another signal regenerating apparatus. Even if the disk 32 was removable, however, the user would not be able to identify whether the disk 32 was present in the cartridge 31, nor recognize whether the disk 31 was contaminated with dust or fingerprints, or damaged by defects.

If such contamination or defects go unrecognized, the signal recording apparatus, when accessing a defective location on the disk, will record the signal in error. A signal recording apparatus can be equipped with a defect detection feature which would allow it to skip defective locations on the disk, however, such a feature reduces recording apparatus performance, and prohibits the apparatus from recording signals at high speed.

It is therefore an object of the present invention to allow a user to recognize whether the disk housed in a cartridge has been taken out of the cartridge, and the signal recording apparatus housing the cartridge can record a signal without accessing a defective place, caused when the disk was removed from the cartridge, on the disk.

SUMMARY OF THE INVENTION

The disk cartridge of the present invention is directed to a disk cartridge that allows the user to access the disk housed in the cartridge.

In one embodiment of the disk cartridge according to the present invention, a cartridge is structured such that a recording apparatus can record a signal onto a medium when the cartridge is mounted on the recording apparatus. The cartridge houses a recording medium, and includes an opening through which the medium can be removed from the cartridge. An indicator on the cartridge informs the user as to whether the recording medium may have been removed from the cartridge.

In a second embodiment of the disk cartridge of the present invention, the cartridge houses a recording medium, and comprises at least one window or opening for recording a signal onto the medium when the cartridge is mounted on the signal recording apparatus. The cartridge includes an opening through which the medium can be removed from the cartridge, a shutter which covers the opening and an indicator which informs the user as to whether the medium may have been removed from the cartridge.

The present invention further provides a signal recording apparatus that detects whether a recording medium has been removed from its cartridge. The signal recording apparatus includes a detector which monitors the indicator on the disk cartridge, and determines whether the medium has been removed from its cartridge. If the detector determines that the medium may have been removed from its cartridge, the signal recording apparatus will not record a signal onto the medium.

DETAILED DESCRIPTION OF THE PREFERRED EMBODIMENTS

Figure 1:
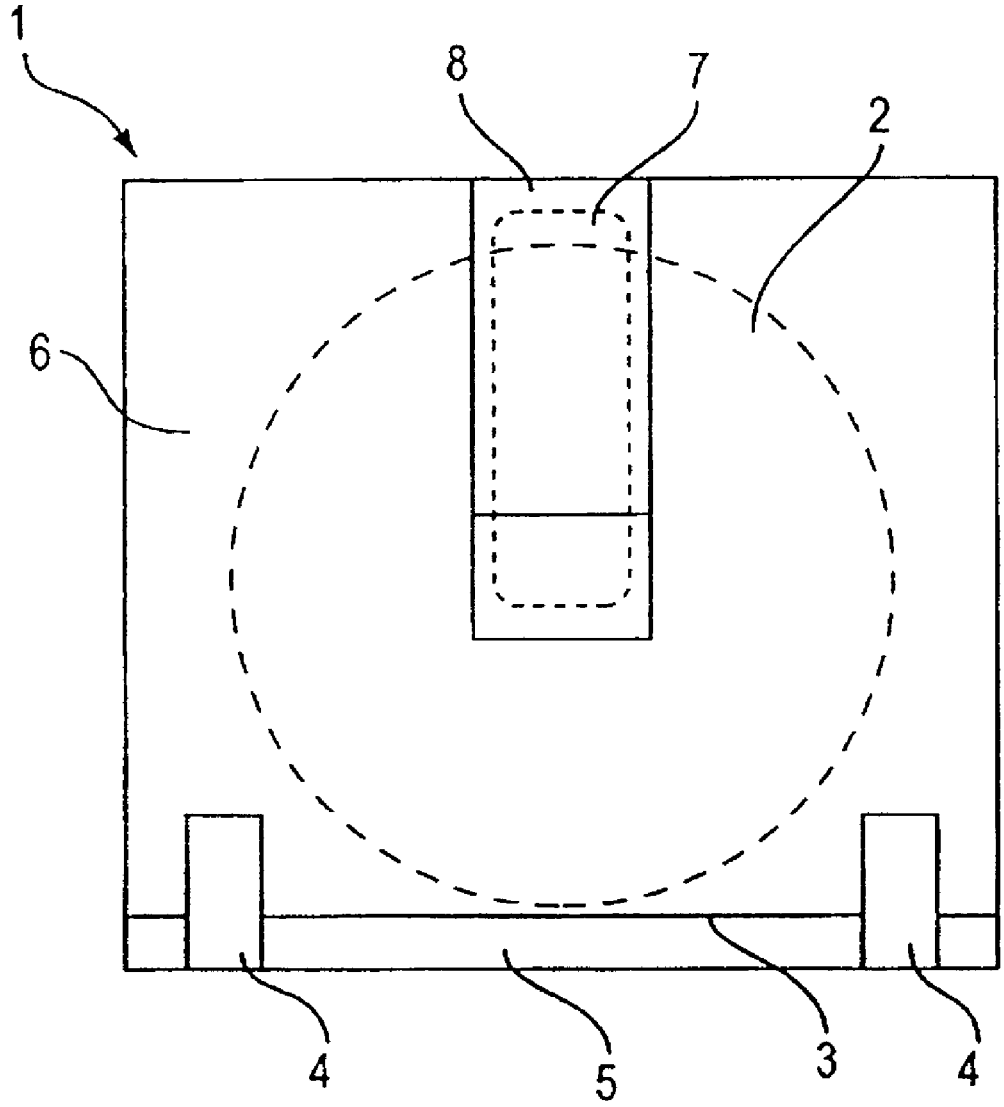
FIG. 1 depicts a cartridge of a first embodiment of the present invention.
Figure 2A:
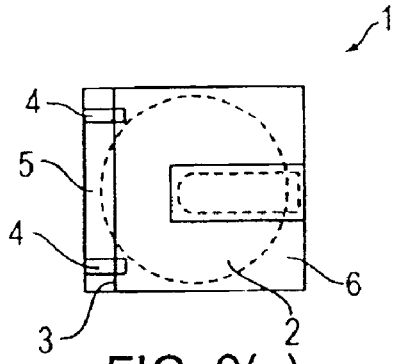
FIGS. 2 (a)–(d) depict a process of taking a disk out of the cartridge of the first embodiment of the present invention.
Figure 2B:
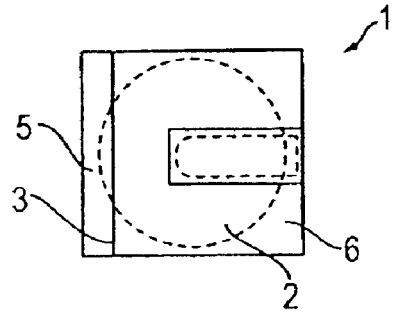
Figure 2C:
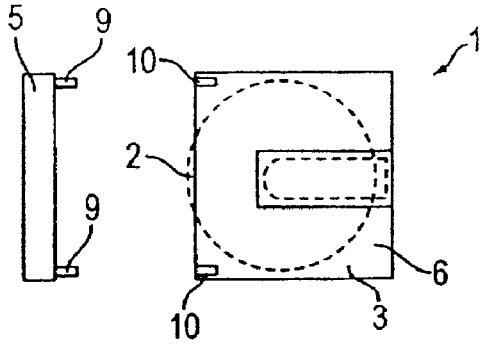
Figure 2D:
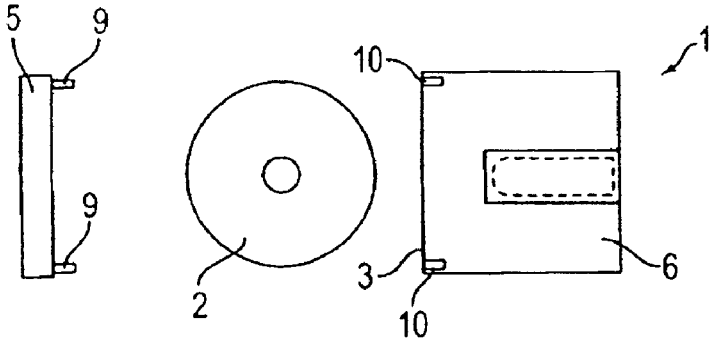

A first embodiment of the cartridge of the present invention is described as follows with reference to the drawings, wherein like or corresponding reference numerals are used for like or corresponding parts throughout the several views.

FIG. 1 depicts a cartridge 1 that houses a recording medium 2. The cartridge 1 is structured such that when the cartridge 1 is mounted on a signal recording apparatus, the disk 2 becomes ready for recording a signal. The opening 3 is provided in the cartridge body 6 for removing the recording medium 2 from the cartridge 1. Adhesive tapes 4 indicate whether the recording medium 2 may have ever been removed from the cartridge 1. The tape preferably has a color that reflects light. In this first embodiment, reflective silver colored adhesive tape is used, however, the color of the tape is not limited to a certain color.

The adhesive tape 4 preferably operates such that once peeled off the cartridge 1, it will not re-adhere as originally manufactured. The adhesive tape, however, can operate in any suitable manner whereby, once peeled off, it exhibits some indication that the cartridge 1 has been opened. A cover 5 seals the opening 3, and removing the cover 5 allows the user to remove the recording medium 2 from the cartridge 1. The cartridge body 6 includes a window 7 which exposes the recording medium 2. The window 2 is covered by the shutter 8. When the cartridge 1 is mounted on the signal recording apparatus, the shutter 8 is automatically opened to expose the window 7.

FIG. 2 (a) through FIG. 2 (d) depict a processing of removing the recording medium 2 from the cartridge 1.

FIG. 2 (a) shows the cartridge 1, having the cartridge body 6 with the cover 5 and adhesive tape 4 in their original condition as received by the user. FIG. 2 (b) depicts the cartridge 1 with the adhesive tape 4 removed from the cartridge body 6. Removing the adhesive tape 4 allows the user to remove the cover 5, as illustrated in FIG. 2 (c). In this first embodiment, a latch 9 is disposed on each end of the cover 5, and each latch 9 snaps into a receptor 10 in the cartridge body 6. FIG. 2 (d) depicts the recording medium 2 when removed from the cartridge body 6.

Figure 3A:
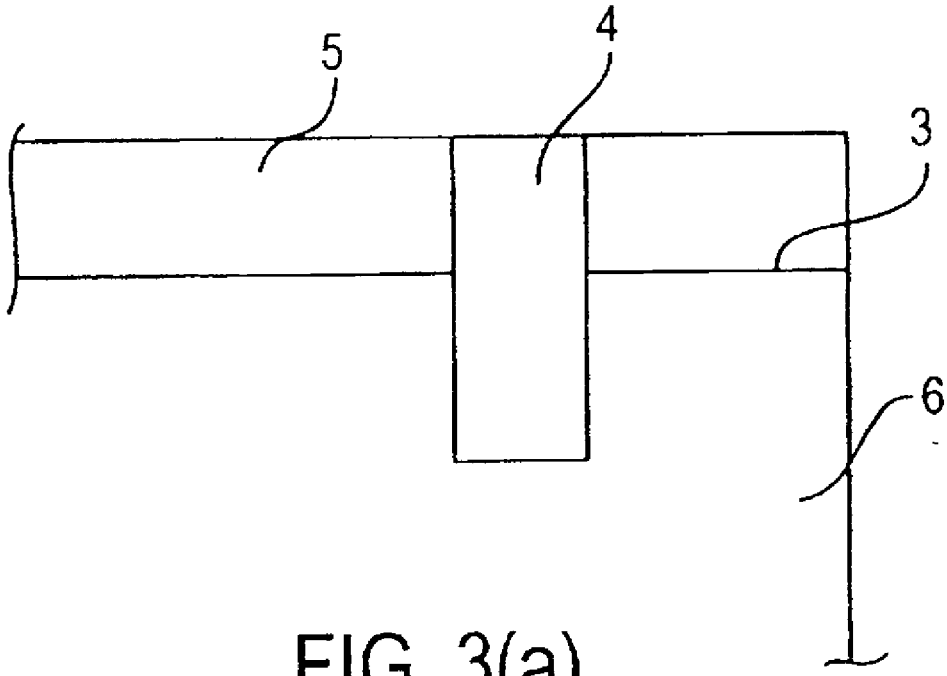
FIGS. 3 (a)–(b) depict an adhesive tape employed in the cartridge of the first embodiment of the present invention.
Figure 3B:
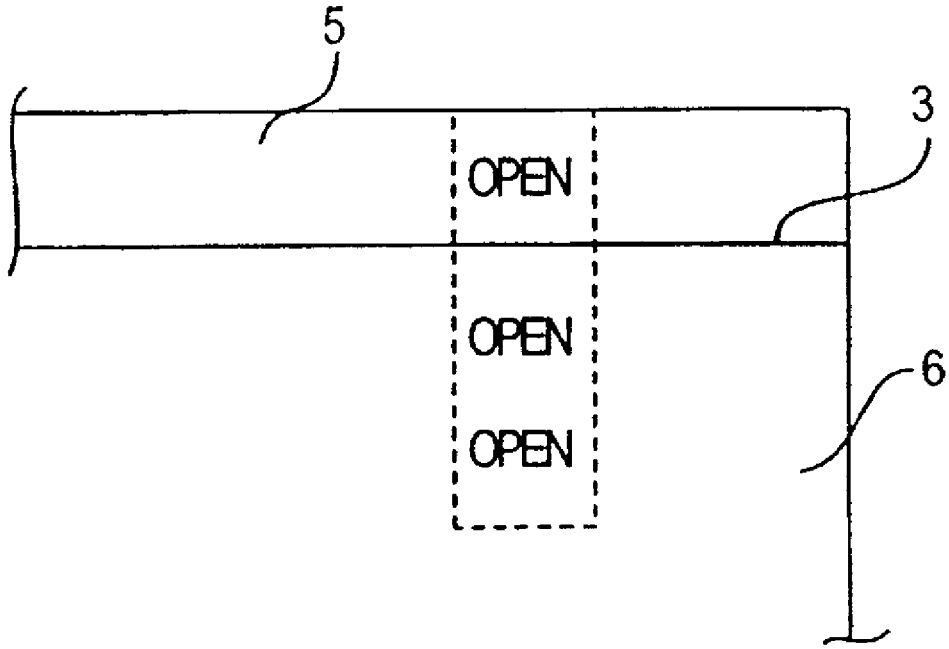

The structure of this first embodiment enables either the cover 5 or the cartridge body 6 to indicate that the adhesive tape 4 has been removed, and that the recording medium 2 may have been removed from the cartridge body 6. In other words, changing the condition of adhesive tape 4 from solid adhesion to both the cartridge body 6 and the cover 5, to a peeled off condition allows the recording medium 2 to be removed from the cartridge body 6. For example, as illustrated in FIGS. 3 (a) and (b), when the adhesive tape 4 is peeled off, a portion of the tape 4 remains on the cartridge body 6 and cover 5, and forms the letters "OPEN" to indicate that the adhesive tape has been peeled off. The user may thereby determine that the cartridge 1 has been opened and that the recording medium 2 may be contaminated with dust and/or fingerprints, or it may have some other defects.

FIG. 1 shows that two sheets of adhesive tape 4 are used, however, the number of sheets may vary. Additionally, the message appearing when the adhesive tape 4 is peeled off is not limited to "OPEN." The only requirement is that the user be able to identify that the adhesive tape 4 has been peeled off indicating that the recording medium 2 may have been removed from the cartridge body 6.

A second embodiment of the cartridge of the present invention is described as follows with reference to the drawings, wherein like or corresponding reference numerals are used for like or corresponding parts throughout the several views.

Figure 4:
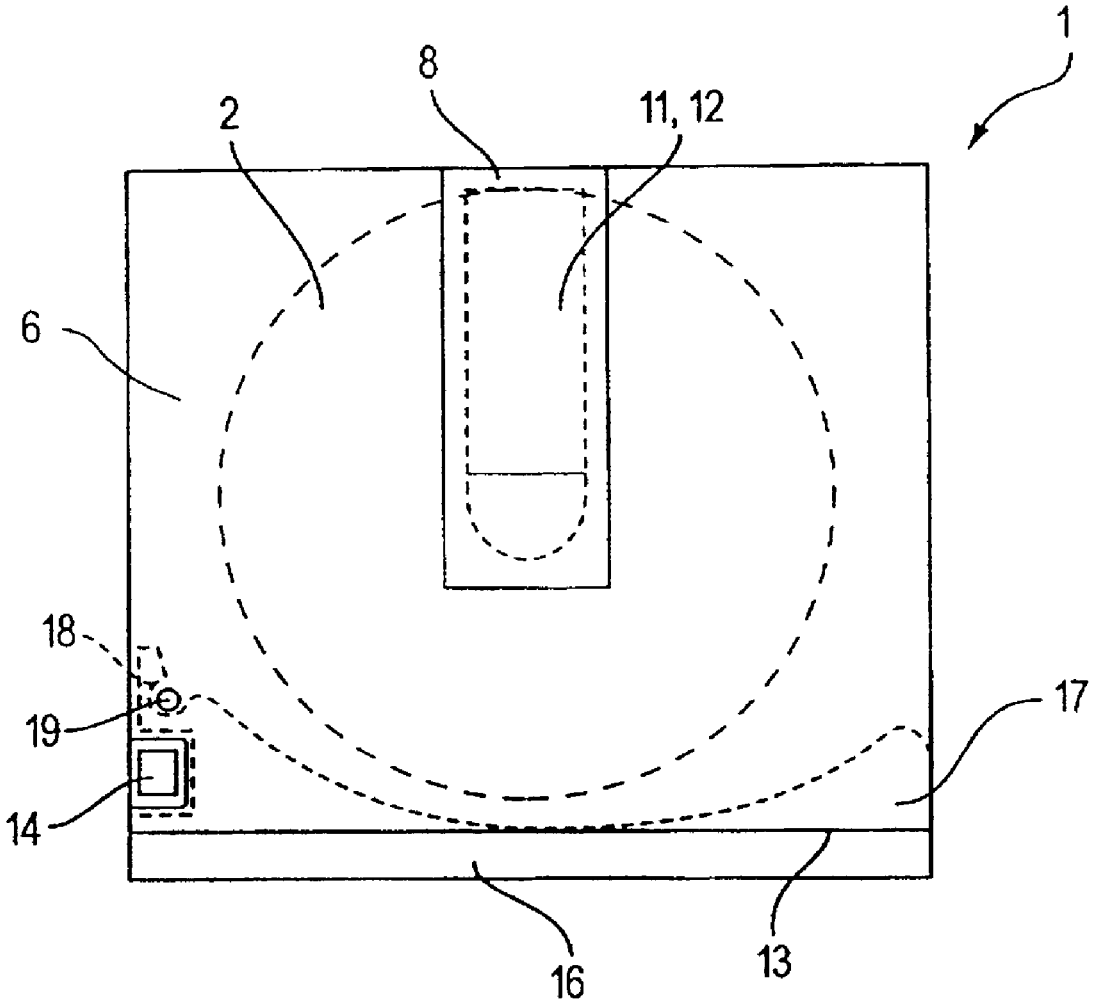
FIG. 4 depicts the cartridge of a second embodiment of the present invention.
Figure 5:
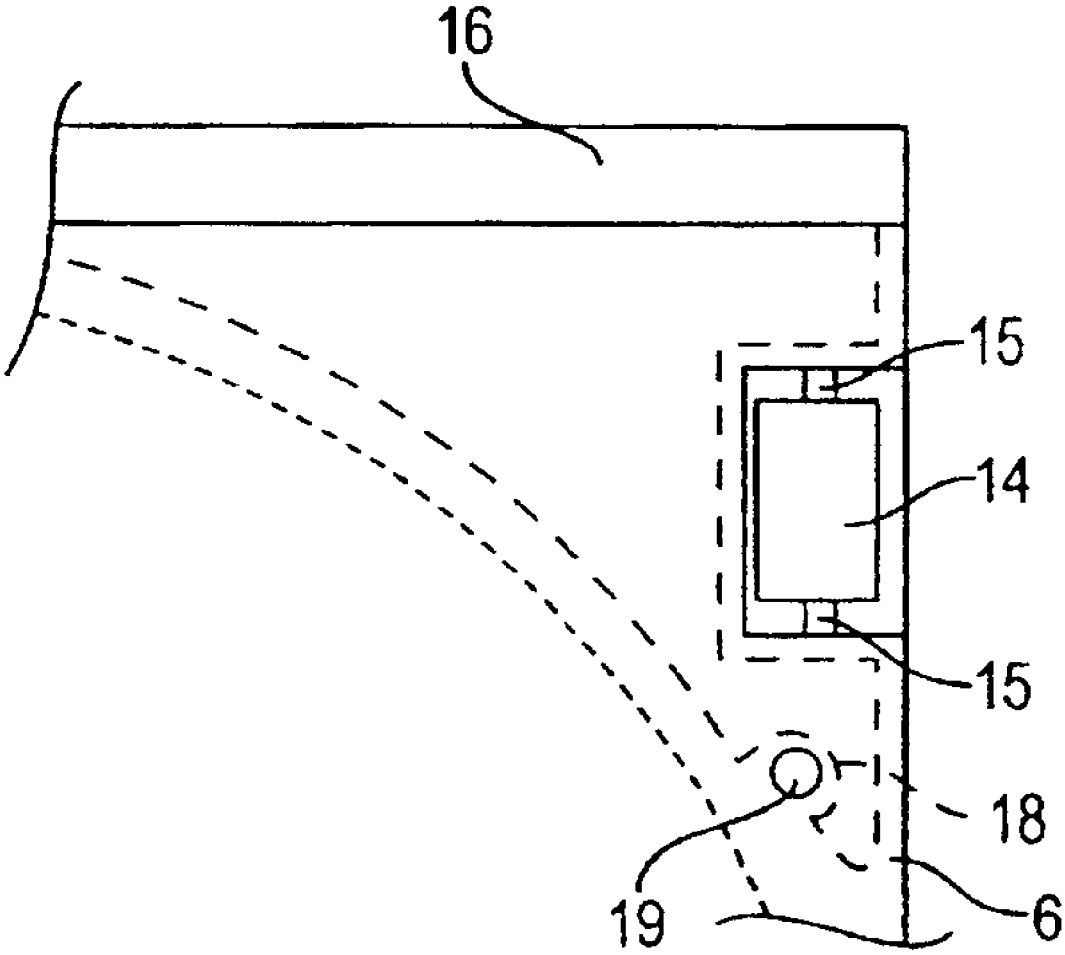
FIG. 5 depicts a claw employed in the cartridge of the second embodiment of the present invention.

Referring to FIG. 4, a first window 11 in cartridge body 6 is used for recording a signal onto the recording medium 2 when the cartridge 1 is mounted on the signal recording apparatus. A second window 12 is provided in the cartridge body 6, on the opposite side of the first window 11, and has approximately the same shape as the first window 11. The second window 12 is used for recording a signal onto the recording medium 2 when the cartridge 1 is mounted on the signal recording apparatus. An opening 13 is provided at an end of the cartridge body 6 for removing the recording medium from the cartridge 1. A claw 14 is provided as an indicator as to whether the cartridge 1 has ever been opened. As shown in FIG. 5, the claw 14 is connected to the cartridge body 6 by a connector 15. In the normal usage, as long as connectors 15 join the claw 14 to the cartridge body 6, the claw 14 prevents the cover 16 from moving or rotating. The cover 16 seals the opening 13 and prevents the removal of the recording medium 2 while the cover 16 is in the closed position, as shown in FIG. 4.

A hinge 17 is mounted to the cartridge body 6, and a first end of the cover 16 is pivotally mounted to the cartridge body 6 at the hinge 17. A second end of the holder 16 includes a latch 18, which engages a receptor 19 of the cartridge body 6, and thereby locks the cover 16 in the closed position.

Figure 6A:
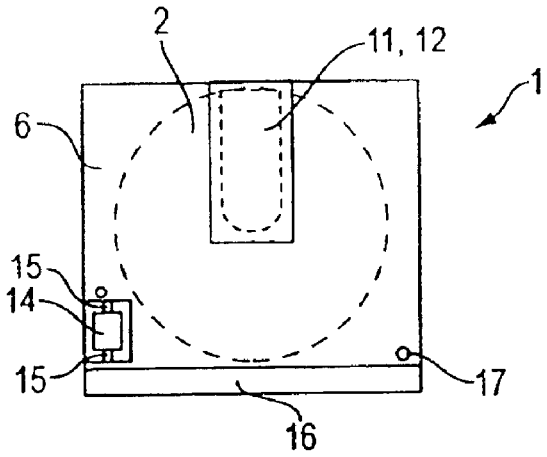
FIGS. 6 (a)–(c) depict a process of taking the disk out the cartridge of the second embodiment of the present invention.
Figure 6B:
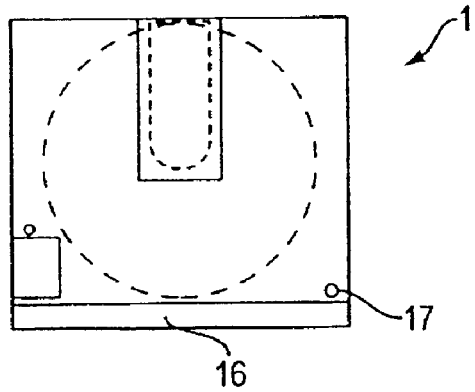
Figure 6C:
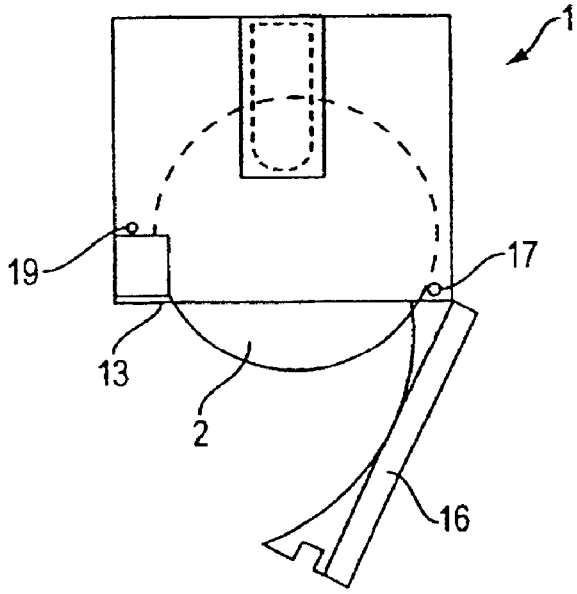

FIG. 6 (a) through (c) depict a procedure for removal of the recording medium 2 from the cartridge 1 of the second embodiment.

FIG. 6 (a) depicts the cartridge body 6 with the cover 16 in the closed or sealed position. The user receives the cartridge 1 in this condition, with the recording medium never having been removed from the cartridge 1.

FIG. 6 (b) depicts the cartridge 1 with the claw 14 removed. To remove the claw 14, the user cuts the connectors 15 which releases the claw 14 from the cartridge body 6. With the claw 14 removed, the cover 16 can be rotated about the hinge 17 which opens the window 13 for access to the recording medium 2, as illustrated in FIG. 6 (c). The recording medium 2 may then be removed from the cartridge body 6 through the window 13.

The above structure only allows the user to remove the recording medium 2 from the cartridge 1 when the claw 14 is removed. The claw 14 thereby serves as an indicator for determining whether the recording medium 2 may have been removed from the cartridge 1. When the connectors 15 have been cut and the claw 14 removed, the user can recognize that the recording medium may have been removed from the cartridge 1, and the user can expect that the recording medium 2 may be contaminated with dust and/or fingerprints, or it may have some defects.

Additionally, since the opening 13, for accessing the recording medium 2, is located on a different face than the first window 11 and the second window 12 a signal recording apparatus handling the cartridge requires no special structure for regenerating a signal from both sides of the disk. In this second embodiment, the first window 11 and the second window 12 are provided for recording and regenerating a signal to/from both sides of the recording medium 2. When either side of the disk is used, however, or only one side of the disk is used, it is sufficient to provide one window.

Figure 7A:
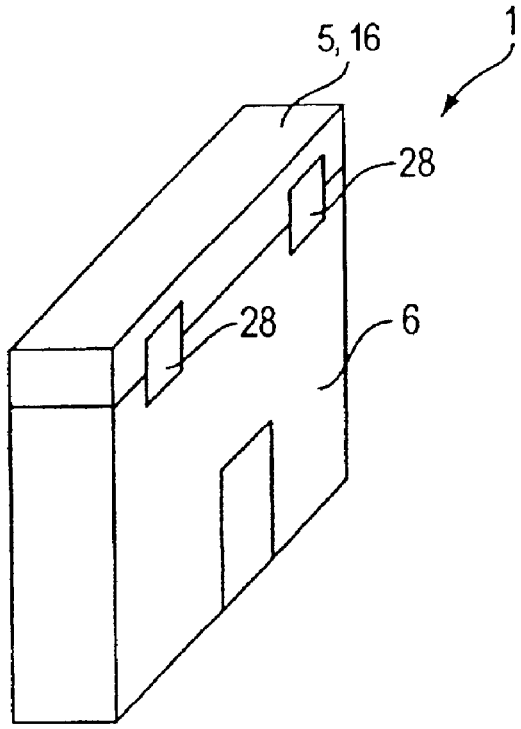
FIGS. 7 (a)–(c) depict an adhesive tape employed in the cartridge of the second embodiment of the present invention.
Figure 7B:
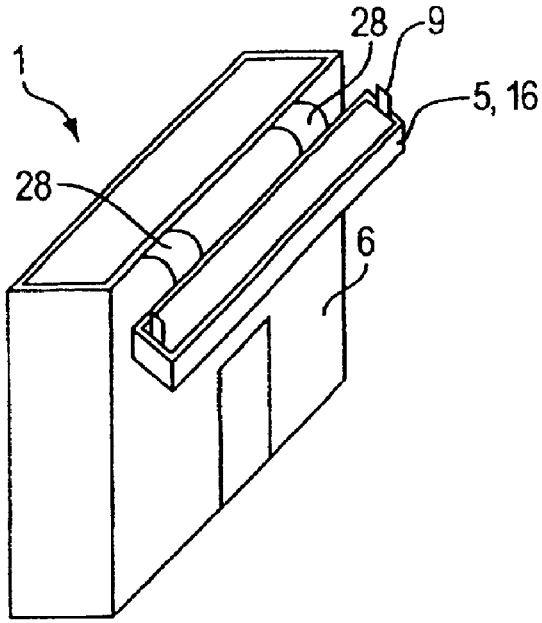

In either the first or second embodiment, the cover 5 or 16 can be removed from the cartridge body 6, however, as shown in FIG. 7 (b), the cover 5 or 16 may remain joined with the cartridge body 6, by hinges 28 as long as the recording medium 2 can be removed from the cartridge 1. FIG. 7 (a) illustrates the cover 5 as mounted to the cartridge body 6, and FIG. 7 (b) illustrates the cover 5 partially removed from the cartridge body 6.

A third embodiment, providing a signal recording apparatus which handles the cartridge of the present invention, is described as follows with reference to the drawings, wherein like or corresponding reference numerals are used for like or corresponding parts throughout the several views.

Figure 8:
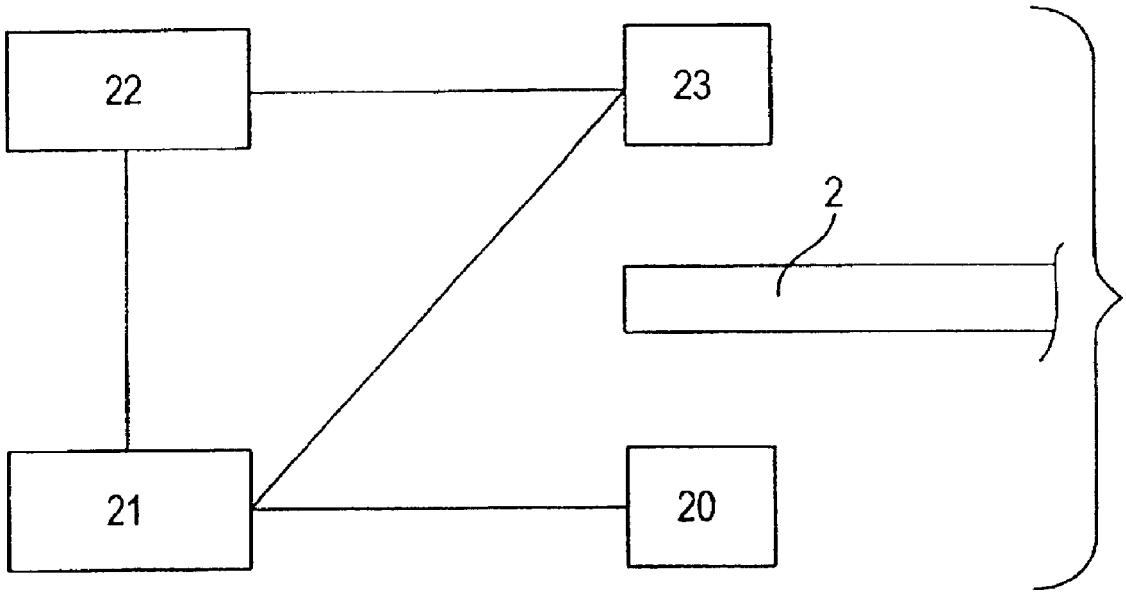
FIG. 8 depicts a block diagram of a signal recording apparatus of a third embodiment of the present invention.

Referring to FIG. 8, a detector 20 detects either the adhesive tape 4 or the claw 14, and thereby determines whether the recording medium 2 has possibly been removed from the cartridge 1. If the detector identifies that the recording medium 2 has possibly been removed from the cartridge 1, a searcher 21 searches for defective or non-recordable locations on the recording medium 2. The recorder 22 records signals onto the recording medium 2 via the head 23, and the searcher 21 searches for defects on the recording medium 2 via the head 23.

Figure 9A:
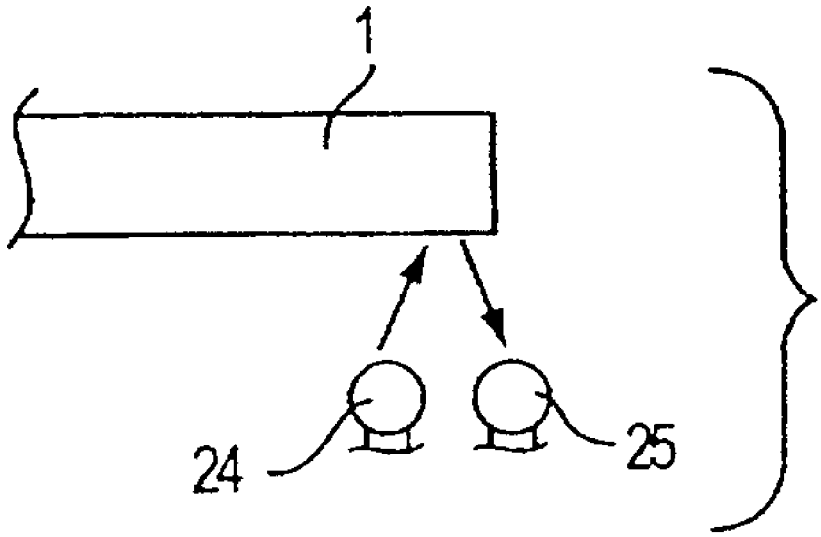
FIG. 9 (a)–(b) depict a detector of the signal recording apparatus of the third embodiment of the present invention.
Figure 9B:
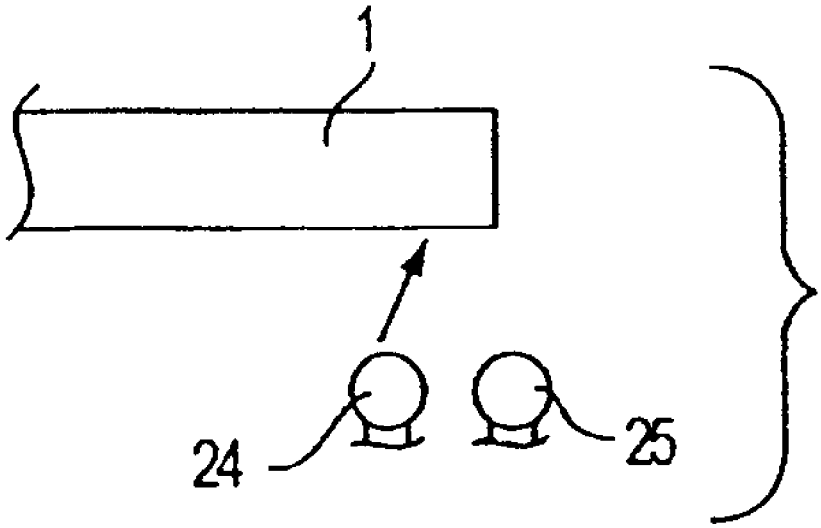
Figure 10A:
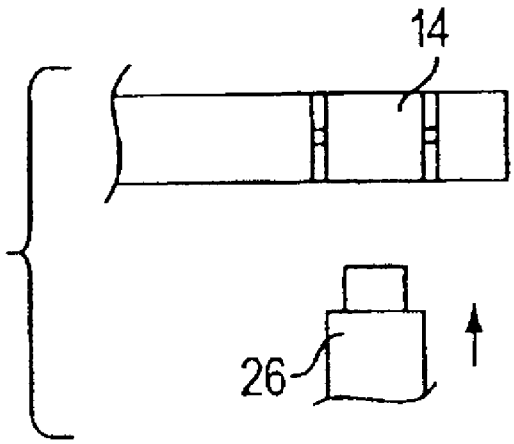
FIG. 10 (a)–(d) depict a detector of the signal recording apparatus of the third em diment of the present invention.
Figure 10B:
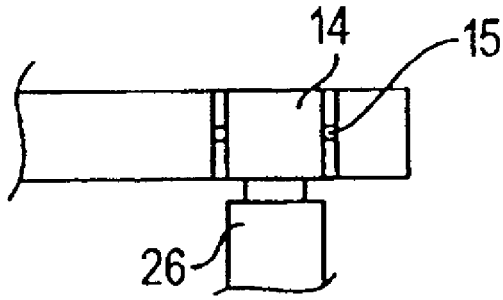
Figure 10C:
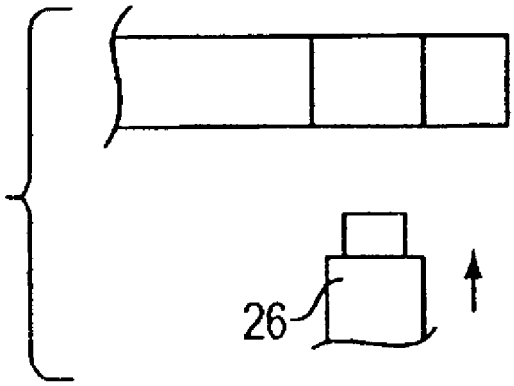
Figure 10D:
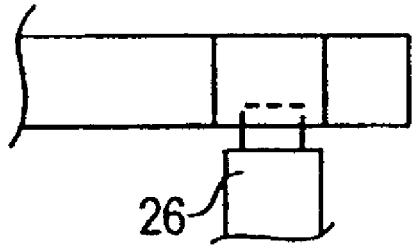

The detector 20 corresponding to the cartridge of the first embodiment with reflective silver tape, as shown in FIGS. 9 (a) and (b), comprises a luminous element 24 which emits a beam of light directed at the adhesive tape on the cartridge 1, and a light receiving element 25 which receives reflected light therefrom.

FIG. 9 (a) depicts a case where the recording medium 2 has never been removed from the cartridge 1, and thus the adhesive tape 4 remains in place. Emitted light from the luminous element 24 reflects off the adhesive tape 4 and is received by the light receiving element 25. The detector 20 determines that the received light exceeds a threshold level, which indicates that the adhesive tape 4 has not been removed and thus the recording medium 2 has never been removed from the cartridge 1.

FIG. 9 (b) depicts a case where the recording medium 2 has possibly been removed from the cartridge 1. When the adhesive tape 4 is no longer on the cartridge 1, a minimal amount of light is reflected from the luminous element 24 to the receiving element 25. The detector 20 determines that the received light does not exceed the threshold level, which indicates that the adhesive tape 4 is not present and thus the recording medium 2 has possibly been removed from the cartridge 1.

As mentioned above, the adhesive tape 4 need not be of a reflective color, for example a light absorbing color like black may be used. In the instance that a light absorbing color is used, the adhesive tape 4 would absorb a portion of the light emitted from the luminous element 24 and the receiver 25 would thus receive a reduced level of reflected light. The detector 20 determines that the received light is below a threshold level, which indicates that the adhesive tape 4 has not been removed and thus the recording medium 2 has never been removed from the cartridge 1.

Another example comprises an adhesive tape material with different reflective properties than that of the cartridge body 6 and cover 5. Accordingly, a different amount of light emitted from the luminous element 24 would be reflected from the adhesive tape 4 than from the cartridge body 6 and cover 5. The detector 20 of the signal recording apparatus detects the level of light reflected from the cartridge body 6 and cover 5, and determines whether the adhesive tape has been removed from the cartridge 1.

The detector 20 corresponding to the cartridge of the second embodiment with the claw 14, as shown in FIGS. 10 (a)–(d), comprises a switch 26 which detects the presence of the claw 14.

FIGS. 10 (a) and 10 (b) depict a situation where the recording medium 2 has never been removed from the cartridge 1. The switch 26 moves upward from an idle position, as shown in FIG. 10 (a), to an operational, as shown in FIG. 10 (b). The switch 26 contacts the claw 14 which compresses the switch. The detector 20 thereby identifies that the disk claw 14 is present, which indicates that the recording medium 2 has never been removed from the cartridge 1.

FIGS. 10 (c) and 10 (d) depict a situation where the recording medium 2 has possibly been removed from the cartridge 1. The detector 20 moves upward from the idle position and enters the hole from where the claw 14 has been removed. The switch 26 does not compress, and the detector 20 thereby identifies that the disk claw 14 is not present, which indicates that the recording medium 2 has possibly been removed from the cartridge 1.

The recording apparatus of this third embodiment, as described above and illustrated in FIG. 8, operates as follows. In the case where the recording medium 2 has never been taken out of the cartridge 1, the searcher 21 does not search for defective places on the recording medium 2, and the recorder 22 records the signal through the head 23. In the case where that the recording medium 2 has possibly been removed from the cartridge 1, either the searcher 21 searches for defective places on the recording medium 2, and the recorder 22 records the signal onto the recording medium 2, skipping the defective location, or the recorder 22 prohibits the recording of the signal onto the recording medium 2 without searching for defective locations. The recording apparatus thereby records a signal onto the recording medium 2 without accessing defective locations and thus increases the reliability and speed of the recording process.

A fourth embodiment, providing an electronic apparatus which handles the cartridge of the present invention, is described as follows with reference to the drawings, wherein like or corresponding reference numerals are used for like or corresponding parts throughout the several views.

Figure 11:
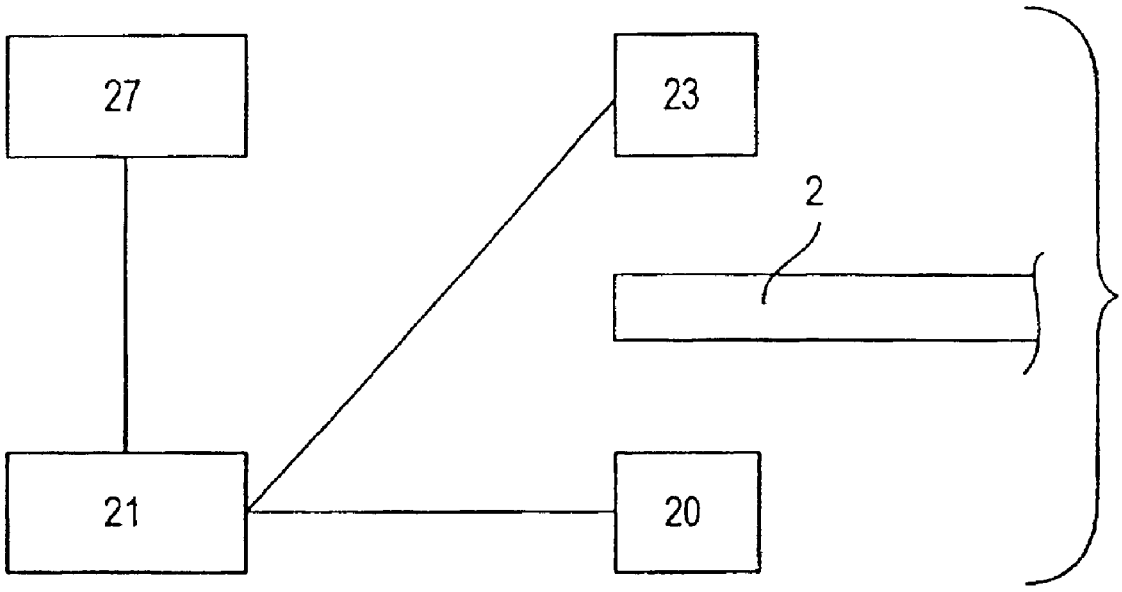
FIG. 11 depicts block diagram of a signal recording apparatus of a fourth embodiment of the present invention.
Figure 12:
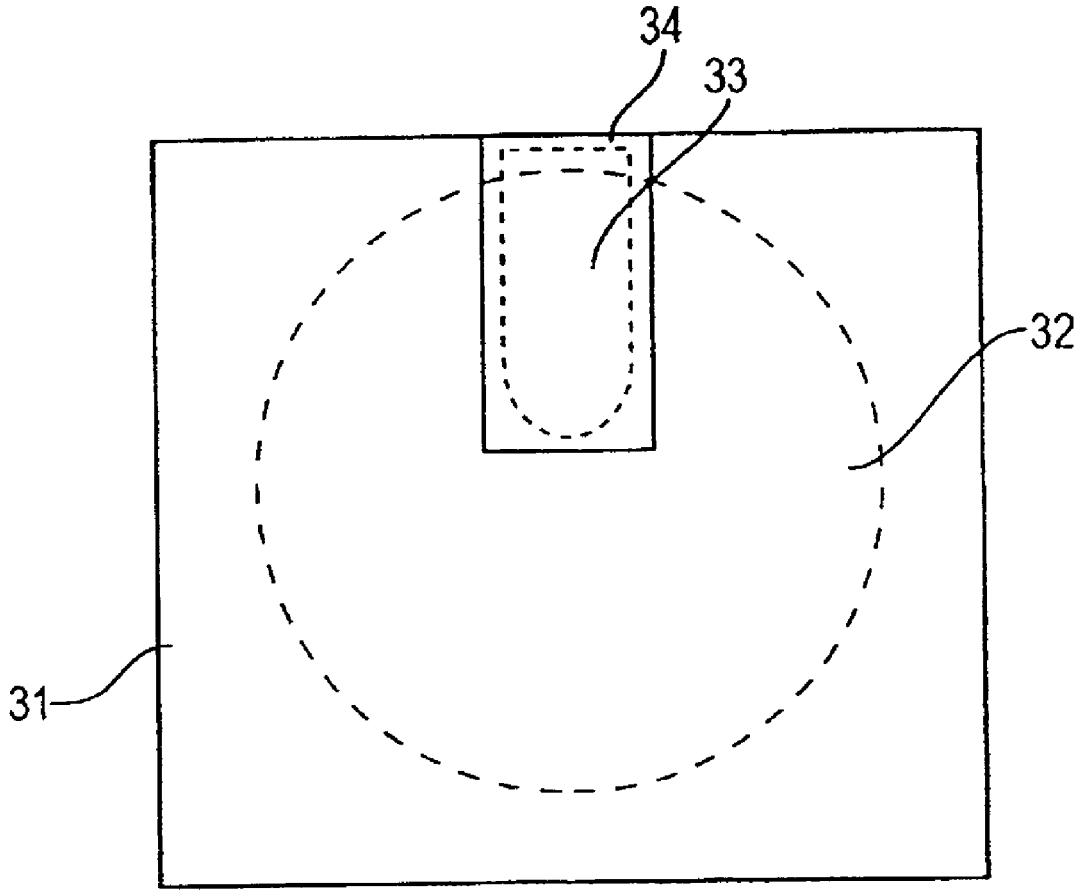
FIG. 12 (PRIOR ART)
FIG. 12 depicts a conventional disk cartridge.

Referring to FIG. 11, a display 27 (e.g. a CRT or LCD) displays a status regarding the amount of recordable and/or non-recordable space on the recording medium 2, as determined by the searcher 21. The display 27 may be separate from, but connected directly or indirectly to, the signal recording apparatus, or may be incorporated therein.

The electronic apparatus of this fourth embodiment, as illustrated in FIG. 11, operates as follows. In the case where the recording medium 2 has never been taken out of the cartridge 1, the searcher 21 does not search for defective places on the recording medium 2, and the display 27 displays the normal recording capacity of the recording medium 2. In the case where that the recording medium 2 has possibly been removed from the cartridge 1, however, the searcher 21 searches for defective places on the recording medium 2, and the display 27 displays the status of the search results indicating the recordable capacity and/or non-recordable capacity of the recording medium 2. Displaying this information on the display 27 gives a user notice of the recordable capacity of the recording medium 2.

A preferred embodiment of the searcher 21 operates by recording an information signal over the entire recording medium 2, and then regenerating the information signal as recorded. The information signal includes an error correction code, and an error can be detected when the information signal is regenerated. When a detected error cannot be corrected, or it can be corrected but it exceeds a specified error range, the sector where the error occurs is not recordable, and the information that the sector cannot be used is recorded at a specified place on the recording medium 2. The recorded information regarding defective sectors can also be displayed on the display 27 to inform the user regarding the recordable capacity of the recording medium 2. This operation is available also for each track or each sector of the recording medium 2, thereby defective or recordable sectors or tracks can be recorded in the specified place of the recording medium 2 for controlling a recording operation to the recording medium 2.

Where the recording medium 2 is an optical disk, a LASER is used in for recording and regenerating signals. In order to store an information singal on the optical disk in an optimum condition, the acceptable output range of the LASER must be narrow. For example, in the case of a commercialized, recordable optical disk, an optimum output range of the LASER must be within plus or minus 10% of the specified power level. When recording an information signal within this range of LASER output power, the error rate does not exceed the specified range (e.g. not more than 0.00001). When regenerating a recorded information signal, however, the error rate will not exceed the specified range, provided the LASER regenerating power output is within plus or minus 50% of the specified power level. Therefore, it is known that an acceptable range of LASER output power for recording is narrow, while that for regenerating is wide.

In other words, once an information signal is recorded, it can be accurately regenerated even if fingerprints, or other defects exist on the optical disk. On the other hand, if fingerprints or other defects exist on the optical disk before recording the signal, reliable recording will be hard to achieve at the affected locations of the disk. Accordingly, after recording a signal onto the optical disk, it is possible to remove the optical disk from a cartridge and load it to a regenerating apparatus to regenerate the signal. The optical can, however, be removed from the cartridge 1 of the present invention, and can be reloadable for recording on the recording apparatus of the present invention. In this case, as explained above, the apparatus searches the recordable medium for defects, and then skips any defective locations while recording the desired signal.

As described above, the present invention provides advantages over the prior art. The present invention provides a disk cartridge that houses a recordable medium, and provides an indication as to whether that recordable medium has possibly ever been removed from the cartridge. The user may thereby determine that the recordable medium might be contaminated with fingerprints, dust or other defects prior to attempting to record a signal onto the recording medium.

The present invention also provides a signal recording apparatus that can detect whether a signal recording medium has possibly ever been removed from the cartridge. The signal recording apparatus, when it determines that a recording medium has possibly been removed from the cartridge, searches for defective locations on the recording medium, and skips any such places during signal recording. The signal recording apparatus thus increases reliability and speed of the recording process.

The present invention further provides an electronic apparatus that informs the user of the recordable capacity of a recording medium that has possibly been removed from the cartridge.

Of course, it should be understood that the wide range of modifications can be made to the exemplary embodiments described above. It is therefore intended that the foregoing detailed description be regarded as illustrative rather than limiting and that it be understood that it is the following claims, including all equivalents, which are intended to define the scope of this invention.

What is claimed is:

[1. A cartridge for housing a recording medium therein, comprising:

a cartridge body configured such that a signal recording apparatus can record a signal onto a removable recording medium housed within said cartridge body when said cartridge body is loaded in said signal recording apparatus;

an opening in said cartridge body for removing said recording medium from said cartridge body; and an indicator for indicating whether a cover over said opening has ever been opened or removed from said cartridge body and for providing such an indication to an electrical detecting device, wherein said indicator comprises a detachable claw mounted to said cartridge body such that detaching said claw from said cartridge body enables a user to unlatch a latch of said cover and thereby open or remove said cover from said cartridge body.]

[2. A cartridge for housing a recording medium therein, comprising:

a cartridge body configured such that a signal recording apparatus can record a signal onto a removable recording medium when said cartridge is loaded in said signal recording apparatus;

an opening in said cartridge body for removing said recording medium from said cartridge body;

a cover covering said opening; and an indicator for indicating whether said cover has ever been opened or removed from said cartridge body and for providing such an indication to an electrical detecting device, wherein said indicator comprises a detachable claw mounted to said cartridge body such that detaching said claw from said cartridge body enables a user to unlatch a latch of said and thereby open or remove said cover from said cartridge body.]

[3. A cartridge for housing a recording medium therein, comprising:

a cartridge body having at least one window for permitting recording of a signal onto a removable recording medium when said cartridge is loaded in a signal recording apparatus;

an opening in said cartridge body for removing said recording medium from said cartridge body;

a cover covering said opening; and an indicator for indicating whether said cover has ever been opened or removed from said cartridge body and for providing such an indication to an electrical detecting device, wherein said indicator comprises a detachable claw mounted to said cartridge body such that detaching said claw from said cartridge body enables a user to unlatch a latch of said cover and thereby open or remove said cover from said cartridge body.]

[4. A cartridge for housing a recording medium therein, comprising:

a cartridge body comprising:

first, second and third surfaces, with said first and second surfaces being on opposite sides of said cartridge body, a first window in said first surface for permitting recording of a signal onto a removable recording medium when said recording medium is loaded in said signal recording apparatus, and a second window in said second surface for permitting recording of a signal onto said recording medium when said recording medium is loaded in said signal recording apparatus, said second window being of an approximately identical shape as that of said first window;

an opening provided in said third surface for removing said recording medium from said cartridge;

a cover covering said opening; and an indicator for indicating whether said cover has ever been opened or removed from said cartridge body and for providing such an indication to an electrical detecting device, wherein said indicator comprises a detachable claw mounted to said cartridge body, such that detaching said claw from said cartridge body enables a user to unlatch a latch of said cover and thereby open or remove said cover from said cartridge body.]

[5. The cartridge of either claims 2, 3 or 4, wherein said claw and said cartridge body comprise a single molded article.]

*6. A signal recording apparatus capable of receiving a cartridge for housing a recording medium therein, said cartridge comprising:*

*a cartridge body configured such that said signal recording apparatus can record a signal onto a removable recording medium housed within said cartridge body when said cartridge body is loaded in said signal recording apparatus;*

*an opening in said cartridge body for removing said recording medium from said cartridge body;*

*an indicator for indicating whether a cover over said opening has ever been opened or removed from said cartridge body, said indicator comprising a detachable claw engaging said cartridge such that detaching said claw from said cartridge enables a user to unlatch a latch of said cartridge and thereby open or remove said cover from said cartridge body; and*

*a detector which determines the presence or absence of said detachable claw.*

*7. A signal recording apparatus capable of receiving a cartridge for housing a recording medium therein, said cartridge comprising:*

*a cartridge body configured such that said signal recording apparatus can record a signal onto a removable recording medium when said cartridge is loaded in said signal recording apparatus;*

*an opening in said cartridge body for removing said recording medium from said cartridge body;*

*a cover covering said opening; and*

*an indicator for indicating whether said cover has ever been opened or removed from said cartridge body, said indicator comprising a detachable claw engaging said cartridge such that detaching said claw from said cartridge enables a user to unlatch a latch of said cartridge and thereby open or remove said cover from said cartridge body; and*

*a detector which determines the presence or absence of said detachable claw.*

*8. A signal recording apparatus capable of receiving a cartridge for housing a recording medium therein, said cartridge comprising:*

*a cartridge body having at least one window for permitting recording of a signal onto a removable recording medium when said cartridge is loaded in said signal recording apparatus;*

*an opening in said cartridge body for removing said recording medium from said cartridge body;*

*a cover covering said opening; and*

*an indicator for indicating whether said cover has ever been opened or removed from said cartridge body, said indicator comprising a detachable claw engaging said cartridge such that detaching said claw from said cartridge enables a user to unlatch a latch of said cartridge and thereby open or remove said cover from said cartridge body,*

*a detector which determines the presence or absence of said detachable claw.*

*9. A signal recording apparatus capable of receiving a cartridge for housing a recording medium therein, said cartridge comprising:*

*a cartridge body comprising;*

*first, second and third surfaces, with said first and second surfaces being on opposite sides of said cartridge body,*

*a first window in said first surface for permitting recording of a signal onto a removable recording medium when said recording medium is loaded in said signal recording apparatus, and*

*a second window in said second surface for permitting recording of a signal onto said recording medium when said recording medium is loaded in said signal recording apparatus, said second window being of an approximately identical shape as that of said first window;*

*an opening provided in said third surface for removing said recording medium from said cartridge;*

*a cover covering said opening; and*

*an indicator for indicating whether said cover has ever been opened or removed from said cartridge body, said indicator comprises a detachable claw engaging said cartridge such that detaching said claw from said cartridge enables a user to unlatch a latch of said cartridge and thereby open or remove said cover from said cartridge body; and*

*a detector which determines the presence or absence of said detachable claw.*

*10. The signal recording apparatus of claims 6, 7, 8 or 9, wherein said detachable claw initially being in the state of engaging said cartridge such that said cover is in a closed position.*

*11. The signal recording apparatus of claim 10, wherein said claw and said cartridge body comprise a single molded article.*

*12. The signal recording apparatus of claim 10, wherein said claw must be detached in order to remove said recording medium from said cartridge.*

*13. The signal recording apparatus of claim 10, wherein said claw being in the detached state indicates that the recording medium may have been removed from said cartridge.*

*14. The signal recording apparatus of claims 6, 7, 8 or 9, wherein said presence of said indicator indicates that said recording medium has not be removed from said cartridge.*

* * * * *